United States Patent
Lahoda et al.

(10) Patent No.: US 10,566,095 B2
(45) Date of Patent: Feb. 18, 2020

(54) COLD SPRAY CHROMIUM COATING FOR NUCLEAR FUEL RODS

(71) Applicants: WESTINGHOUSE ELECTRIC COMPANY LLC, Cranberry Township, PA (US); WISCONSIN ALUMNI RESEARCH FOUNDATION, Madison, WI (US)

(72) Inventors: Edward J. Lahoda, Edgewood, PA (US); Peng Xu, Columbia, SC (US); Zeses Karoutas, Lexington, SC (US); Sumit Ray, Columbia, SC (US); Kumar Sridharan, Madison, WI (US); Benjamin Maier, Waunakee, WI (US); Greg Johnson, Madison, WI (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 433 days.

(21) Appl. No.: 15/284,076

(22) Filed: Oct. 3, 2016

(65) Prior Publication Data
US 2018/0025793 A1    Jan. 25, 2018

Related U.S. Application Data

(60) Provisional application No. 62/365,518, filed on Jul. 22, 2016.

(51) Int. Cl.
*G21C 3/06* (2006.01)
*G21C 3/07* (2006.01)
(Continued)

(52) U.S. Cl.
CPC ............... *G21C 3/07* (2013.01); *B32B 15/01* (2013.01); *C23C 24/08* (2013.01); *C23C 24/082* (2013.01);
(Continued)

(58) Field of Classification Search
CPC ... G21C 3/00; G21C 3/06; G21C 3/07; G21C 9/00; G21C 21/02; B32B 15/01;
(Continued)

(56) References Cited

U.S. PATENT DOCUMENTS 5,302,414 A * 4/1994 Alkhimov ............... B05B 7/144
427/191
8,675,809 B2  3/2014 Lahoda et al.
(Continued)

FOREIGN PATENT DOCUMENTS

KR    10-1393327 B1    5/2014

OTHER PUBLICATIONS

A. Moridi; Cold Spray Coating: Review of Material Systems and Future Perspective; Surface Engineering, 2014, pp. 369-395; vol. 36.
(Continued)

*Primary Examiner* — Marshall P O'Connor
(74) *Attorney, Agent, or Firm* — Eckert Seamans Cherin & Mellott, LLC; Christine R. Ethridge

(57) ABSTRACT

A method is provided for coating the substrate of a component, such as a zirconium alloy cladding tube, for use in a water cooled nuclear reactor under normal operating conditions and under high temperature oxidation conditions. The method includes heating a pressurized carrier gas to a temperature between 200° C. and 1200° C., adding chromium or chromium-based alloy particles having an average diameter of 20 microns or less to the heated carrier gas, and spraying the carrier gas and particles onto the substrate at a velocity, preferably from 800 to 4000 ft./sec. (about 243.84 to 1219.20 meters/sec.), to form a chromium and/or chromium-based alloy coating on the substrate to a desired thickness.

23 Claims, 3 Drawing Sheets

(51) Int. Cl.
   *B32B 15/01*   (2006.01)
   *C23C 24/08*   (2006.01)
   *C23C 30/00*   (2006.01)
   *G21C 21/02*   (2006.01)

(52) U.S. Cl.
   CPC ............ *C23C 24/087* (2013.01); *C23C 30/00* (2013.01); *G21C 21/02* (2013.01); *Y02E 30/40* (2013.01)

(58) Field of Classification Search
   CPC ..... C23C 24/08; C23C 24/082; C23C 24/087; C23C 30/00
   See application file for complete search history.

(56) References Cited

U.S. PATENT DOCUMENTS

| | | | |
|---|---|---|---|
| 8,792,607 | B2 | 7/2014 | Kim et al. |
| 2013/0344348 | A1 | 12/2013 | Koo et al. |
| 2014/0254740 | A1* | 9/2014 | Ledford ................... G21C 3/07 376/417 |
| 2015/0050521 | A1* | 2/2015 | Le Flem ................ B32B 15/01 428/662 |
| 2015/0348652 | A1* | 12/2015 | Mazzoccoli ........... G21C 21/16 376/409 |

OTHER PUBLICATIONS

K. Sridharan; Cold Spray Materials Deposition Technology; Power Point Presentation, International Thermal Spray Conference; 2012; Department of Engineering Physics, University of Wisconsin-Madison.

R.W. Smith; Plasma Spray Deposition: A Need for Direct Process Control; pp. 1169-1183; Drexel University, Philadelphia, PA. (Publication date unknown).

An Introduction of Thermal Spray; Oerlikon Metco; Nov. 2015; Issue 6.

* cited by examiner

COLD SPRAY CHROMIUM COATING FOR NUCLEAR FUEL RODS

RELATED APPLICATIONS

This application claims priority from U.S. Provisional Application Ser. No. 62/365,518 filed Jul. 22, 2016 and incorporated herein by reference.

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The invention relates to coatings for nuclear fuel rod cladding, and more particularly to the use of cold spray methods for depositing chromium on a zirconium alloy flat, cylindrical, or tubular substrate.

2. Description of the Prior Art

Zirconium alloys rapidly react with steam at temperatures of 1100° C. and above to form zirconium oxide and hydrogen. In the environment of a nuclear reactor, the hydrogen produced from that reaction would dramatically pressurize the reactor and would eventually leak into the containment or reactor building leading to potentially explosive atmospheres and to potential hydrogen detonations, which could lead to fission product dispersion outside of the containment building. Maintaining the fission product boundary is of critical importance.

U.S. Patent Application US 2014/0254740 discloses efforts to apply metal oxides, ceramic materials, or metallic alloys that contain chromium to a zirconium alloy cladding tube using a thermal spray, such as a cold spray technique wherein powderized coating materials are deposited with substantial velocity on a substrate in order to plastically deform the particles into a flattened, interlocking material that forms a coating. See U.S. Pat. No. 5,302,414.

The suitability of materials for cold spray application depends mainly on their deformation properties. Materials with relatively low melting points and low mechanical strength such as Zn and Cu have been shown to be ideal materials for cold spray application as they have a low yield strength and exhibit significant softening at elevated temperatures. Al is also shown to be a good candidate but is more difficult to apply than other soft materials. Materials with higher strength such as Fe and Ni based materials do not provide successful deposition. A. Moridi et al., Cold spray coating: review of material systems and future perspectives, *Surface Engineering*, vol. 36, No. 6, pp. 369-395 (2014).

Metallic chromium is known to provide excellent corrosion resistance. It is a hard and brittle metal, and has not been considered to be a good candidate for deposition by cold spray because of its lack of ductility and high melting point.

There is a need for dramatically reducing the rate of reaction of steam with zirconium cladding to avoid generation of large quantities of hydrogen. There is a need for dramatically reducing the rate of reaction of steam with zirconium cladding to contain fission products.

SUMMARY OF THE INVENTION

The method described herein addresses the problem associated with the potential reaction of steam with zirconium in a nuclear reactor. The method described herein provides a corrosion resistant coating that forms a barrier on the zirconium substrate.

In various aspects, a method of coating a substrate of a component for use in a water cooled nuclear reactor is provided. The method includes heating a pressurized carrier gas to a temperature between 200° C. and 1200° C., adding particles having an average diameter of 20 microns or less to the heated carrier gas, and spraying the carrier gas with entrained particles onto a substrate at a velocity of 800 to 4000 ft./sec. (about 243.84 to 1219.20 meters/sec) to form a coating on the substrate to a desired thickness, for example, up to 100 or more microns. The particles are selected from pure chromium particles, chromium-based alloys and combinations thereof.

When the particles are chromium-based alloys, they may comprise 80 to 99 atom % of chromium. In various aspects, the chromium-based alloy may include at least one element selected from the group consisting of silicon, yttrium, aluminum, titanium, niobium, zirconium, and transition metal elements, at a combined content of 0.1 to 20 atomic %.

The carrier gas may be heated at a pressure up to 5.0 MPa.

The carrier gas and particles are preferably sprayed continuously at very high rates until the desired coating thickness is reached. The coating thickness may, for example, be between 5 and 100 microns, but greater thicknesses of, for example, several hundred microns, may be deposited.

Following formation of the coating, the method may further include annealing the coating. Annealing may impart ductility and may create sub-micron sized grains that, it is believed, will be beneficial for isotropy in properties and resistance to radiation damage.

The substrate is preferably a zirconium alloy and the component, in various aspects, may be a cladding tube for a nuclear fuel rod. The substrate may be any shape associated with the component to be coated. For example, the substrate may be cylindrical in shape, curved, or may be flat.

The carrier gas is advantageously selected from inert and unreactive gases. In various aspects, the carrier gas may be selected from the group consisting of nitrogen, hydrogen, argon, carbon dioxide, helium, and combinations thereof.

The method described herein also provides a cladding tube formed from a zirconium alloy and having a coating deposited thereon. The coating is selected from pure chromium, chromium-based alloys and combinations thereof. The coating may be of a desired thickness, but typically would be about 5 to 100 microns or more. Cold spray coatings can be built up to several hundred microns thick.

The coating acts as a corrosion barrier for the substrate. When the substrate is a zirconium alloy cladding, the chromium coating provides a barrier against corrosion at normal operating conditions, for example, between 270° C. and 350° C. in pressurized water reactors and between 200° C. and 300° C. in boiling water reactors. The coating reduces the steam zirconium and air zirconium reactions and hydrogen generation at high temperatures, i.e., those greater than 1100° C.

BRIEF DESCRIPTION OF THE DRAWINGS

The characteristics and advantages of the present disclosure may be better understood by reference to the accompanying figures.

DESCRIPTION OF THE PREFERRED EMBODIMENTS

Figure 1:
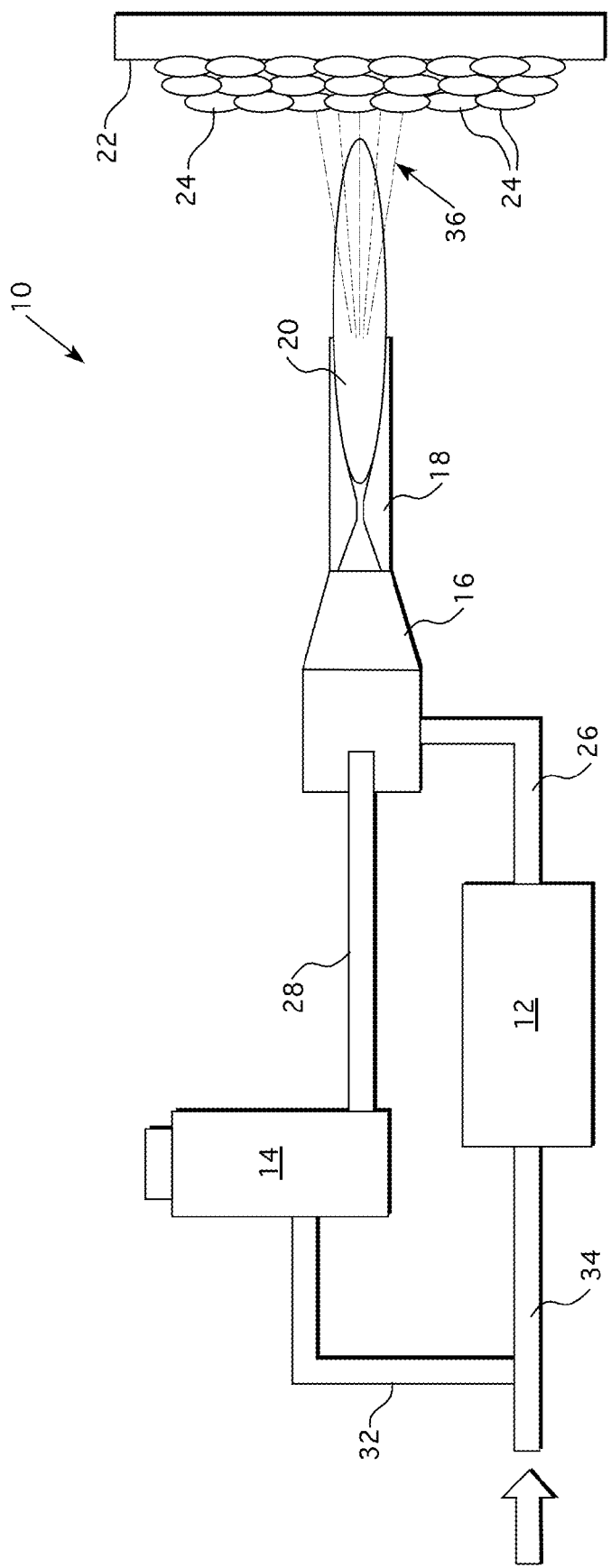
FIG. 1 is a schematic illustration of a cold spray process.

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

An improved cold spray method has been developed that deposits chromium (Cr) or chromium-based alloys onto the surface of a substrate, including tubular surfaces. Of particular interest, are substrates used as components in nuclear reactors, and more specifically, zirconium alloy substrates, such as fuel rod cladding tubes used in water cooled nuclear reactors.

"Pure Cr", or "pure chromium", as used herein, means 100% metallic chromium that may include trace amounts of unintended impurities that do not serve any metallurgical function. For example, pure Cr may contain a few ppm of oxygen. "Cr-alloy," "chromium alloy," "Cr-based alloy," or chromium-based alloy" as used herein refer to alloys with Cr as the dominant or majority element together with small but reasonable amounts of other elements that serve a specific function. The Cr alloy may comprise 80% to 99 atom % of chromium. Other element in the Cr alloy may include at least one chemical element selected from silicon, yttrium, aluminum, titanium, niobium, zirconium, and other transition metal elements. Such elements may be present for example at a content of 0.1 atomic % to 20 atomic %.

"Cr-containing alloys" or "chromium-containing alloys" are those where Cr is added in smaller quantities than the majority element or elements. For example, 316 stainless steel, which is an iron-based alloy that contains 16 to 18% Cr and 10 to 14% Ni, would be classified as Cr-containing, but not Cr-based.

The improved coating method improves the integrity of the cladding tube coating under high temperature accident conditions and equally as important, under normal operating conditions. Even under normal operating conditions hydrogen may form due to Zr oxidation or may be present in water. This hydrogen diffuses into the Zr-cladding (called hydriding) and causes brittleness in the cladding. The improved Cr coated cladding tube will be less susceptible to hydriding of Zr-cladding which would contribute to increased cycle length, and thus, improve the economics of operating the reactor. The Cr coated cladding tube is also expected to resist delayed hydride cracking, so it would perform better in subsequent dry cask storage.

The Cr or Cr-based alloy coating provided by the method described herein will reduce hydriding by way of reduced oxidation and by acting as a diffusion barrier to hydrogen in the water from entering the cladding. There are important benefits to having such a Cr coating even under normal conditions, but the role of the Cr or Cr-based coating becomes indispensable during higher temperature accident conditions.

Cr exhibits negligible thermal diffusion into the underlying Zr under normal operating conditions and even at temperatures up to 650° C. Despite the intimate contact between the coating and the substrate induced by cold spray there is only very limited inter-diffusion between the pure Cr coating and the substrate at 1200° C. It is believed that in fact, the slight thermal diffusion that occurs under accident temperatures may be beneficial in keeping the coating anchored to the substrate.

The method proceeds by delivering a carrier gas to a heater where the carrier gas is heated to a temperature sufficient to maintain the gas at a reasonable temperature (e.g., 100° C. to 500° C.) after expansion in the nozzle. The expansion of the gas propels the particles. In various aspects, the carrier gas may be heated to a temperature between 200° C. and 1200° C., with a pressure, for example, of 5.0 MPa. In certain aspects, the carrier gas may be heated to a temperature between 200° C. and 800° C. In certain aspects, the carrier gas may be heated to between 300° C. and 800° C. and in other aspects, may be heated to a temperature between 500° C. and 800° C. The temperature to which the gas is preheated depends on the gas used as the carrier and on the Joule-Thomson cooling coefficient of the particular gas. Whether or not a gas cools upon expansion or compression when subjected to pressure changes depends on the value of its Joule-Thomson coefficient. For positive Joule-Thomson coefficients, the carrier gas cools and must be preheated to prevent excessive cooling which can affect the performance of the cold spray process. Those skilled in the art can determine the degree of heating using well known calculations to prevent excessive cooling. See, for example, for $N_2$ as a carrier gas, if the inlet temperature is 130° C., the Joule-Thomson coefficient is 0.1° C./bar. For the gas to impact the tube at 130° C. if its initial pressure is 10 bar (~146.9 psia) and the final pressure is 1 bar (~14.69 psia), then the gas needs to be preheated to about 9 bar*0.1° C./bar or about 0.9 C to about 130.9° C.

For example, the temperature for helium gas as the carrier is preferably 450° C. at a pressure of 3.0 to 4.0 MPa, and the temperature for nitrogen as the carrier may be 1100° C. at a pressure of 5.0 MPa, but may also be 600° C.-800° C. at a pressure of 3.0 to 4.0 MPa. Those skilled in the art will recognize that the temperature and pressure variables may change depending on the type of the equipment used and that equipment can be modified to adjust the temperature, pressure and volume parameters.

Suitable carrier gases are those that are inert or are not reactive, and those that particularly will not react with the Cr or Cr-based alloy particles or the substrate. Exemplary carrier gases include nitrogen ($N_2$), hydrogen ($H_2$), argon (Ar), carbon dioxide ($CO_2$), and helium (He). There is considerable flexibility in regard to the selected carrier gases. Mixtures of gases may be used. Selection is driven by both physics and economics. For example, lower molecular weight gases provide higher velocities, but the highest velocities should be avoided as they could lead to a rebound of particles and therefore diminish the number of deposited particles.

Referring to FIG. 1, a cold spray assembly 10 is shown. Assembly 10 includes a heater 12, a powder or particle hopper 14, a gun 16, nozzle 18 and delivery conduits 34, 26, 32 and 28. High pressure gas enters conduit 24 for delivery to heater 12, where heating occurs quickly; substantially instantaneously. When heated to the desired temperature, the gas is directed through conduit 26 to gun 16. Particles held in hopper 14 are released and directed to gun 16 through conduit 28 where they are forced through nozzle 18 towards the substrate 22 by the pressurized gas jet 20. The sprayed particles 36 are deposited onto substrate 22 to form a coating 30 comprised of particles 24.

The cold spray process relies on the controlled expansion of the heated carrier gas to propel the particles onto the substrate. The particles impact the substrate or a previous deposited layer and undergo plastic deformation through adiabatic shear. Subsequent particle impacts build up to form the coating. The particles may also be warmed to temperatures one-third to one-half the melting point of powder expressed in degrees Kelvin before entering the flowing carrier gas in order to promote deformation. The nozzle is rastered (i.e., sprayed in a pattern in which an area is sprayed from side to side in lines from top to bottom) across the area to be coated or where material buildup is needed.

Coating tubular geometries, rather than just flat surfaces, has heretofore been challenging. Whereas flat surfaces can readily be coated, tubular and other curved surfaces have been economically challenging. Coating a tubular or cylindrical geometry requires the tube be rotated as the nozzle moves lengthwise across the tube or cylinder. The nozzle traverse speed and tube rotation are in synchronized motion so that uniform coverage is achieved. The rate of rotation and speed of traverse can vary substantially as long as the movement is synchronized for uniform coverage. The tube may require some surface preparation such as grinding or chemical cleaning to remove surface contamination to improve adherence and distribution of the coating.

In various aspects of the method, the particles are pure metallic chromium particles that have an average diameter of less than 20 microns. By "average diameter," as used herein, those skilled in the art will recognize that the particles may be both spherical and non-spherical so that the "diameter" will be the longest dimension of the regularly or irregularly shaped particles, and the average diameter means that there will be some variation in the largest dimension of any given particle above or below 20 microns, but the average of the longest dimension of all particles used in the coating are together, 20 microns or less.

The chromium or chromium-based alloy particles are solid particles. The chromium particles become entrained in the carrier gas when brought together in gun 16. The nozzle 18 narrows to force the particles and gas together and to increase the velocity of the gas jet 20 exiting nozzle 18. The particles are sprayed at a velocity sufficient to provide a compact, impervious, or substantially impervious, Cr and/or Cr-based alloy layers. In various aspects the velocity of the jet spray may be from 800 to 4000 ft./sec. (about 243.84 to 1219.20 meters/sec.). The particles 24 are deposited onto the surface of the substrate at a rate sufficient to provide the desired production rate of coated tubing, at a commercial or research level.

The rate of particle deposition depends on the powder apparent density (i.e., the amount of powder vs. the air or empty space in a specific volume) and the mechanical powder feeder or hopper used to inject the powder particles into the gas stream. Those skilled in the art can readily calculate the rate of deposition based on the equipment used in the process, and can adjust the rate of deposition by altering the components that factor into the rate. In certain aspects of the method, the rate of particle deposition may be up to 1000 kg/hour. An acceptable rate is between 1 and 100 kg/hour, and in various aspects, between 10 and 100 kg/hour, but higher and lower rates, such as 1.5 kg/hour, have been successfully used.

The rate of deposition is important from the standpoint of economics when more tubes can be sprayed per unit of time at higher deposition rates. The repetitive hammering of particles one after the other has a beneficial effect on improving interparticle bonding (and particle-substrate bonding) because of the longer duration of transient heating. Transient heating occurs over micro- or even nano-second time scale and over nanometer length scales. It can also result in the fragmentation and removal of nanometer thickness oxide layers that are inherently present on all powder and substrate surfaces. The spray continues until a desired thickness of the coating on the substrate surface is reached. In various aspects, a desired thickness may be several hundred microns, for example, from 100 to 300 microns, or may be thinner, for example, from 5 to 100 microns. The coating should be thick enough to form a barrier against corrosion. The coating barrier reduces, and in various aspects may eliminate, any steam zirconium and air zirconium reactions, and reduces, and in various aspects eliminates, zirconium hydride formation at temperatures of about 1000° C. and above.

Figure 2A:
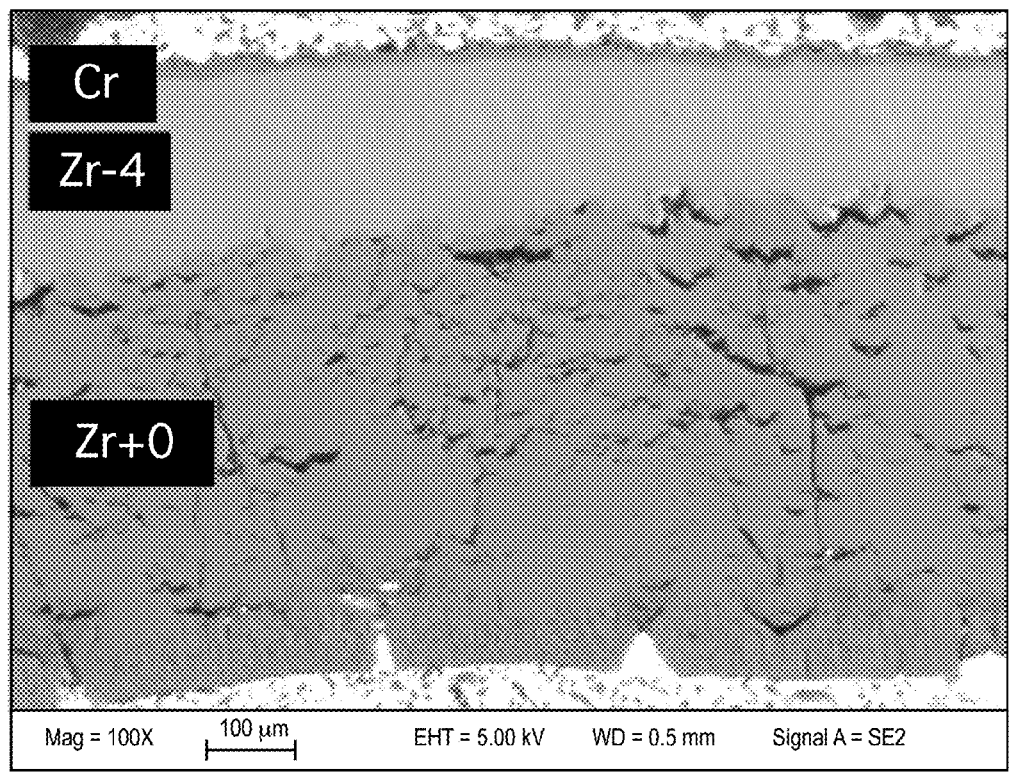
FIG. 2(a) is a cross-sectional low magnification image of a Cr cold spray coated Zr-alloy tube after air oxidation at 1200° C. for 20 minutes. The outer surface (top of the photomicrograph) is Cr coated, but the inner surface of the tube (bottom of the photomicrograph) is not coated. Note the dramatic difference in oxidation between the two sides (5 micron oxidation loss in Cr coating and 400 micron oxidation loss in bare Zr-alloy).
Figure 2B:
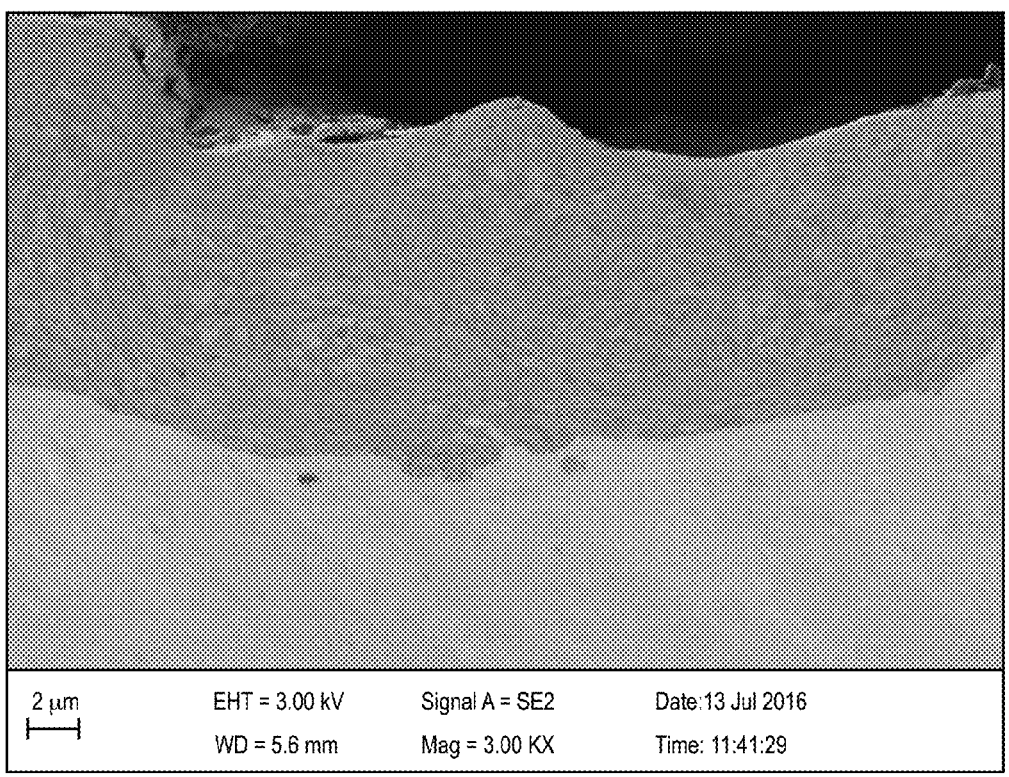
FIG. 2(b) is a high magnification image of an as-deposited Cr coating (top, dark grey) on a Zr-alloy substrate (bottom, light grey).

Referring to FIGS. 2a and 2b, a Zr-alloy (Zircaloy-4) tube was coated on the outer side with Cr by the cold spray method described herein. The tube was not coated on the inner side, which therefore remains a Zircaloy-4 surface. After air oxidation at 1200° C. for 20 minutes, an image of the cross section of the coated tube was made. This low magnification photomicrograph shows the entire tube cross-section from outer surface to the inner surface of the tube. Note that the inner uncoated Zr-alloy surface is highly oxidized but the outer surface that was Cr coated shows very little oxidation. Cr loss due to oxidation is about 5 microns, but Zircaloy-4 loss is 400 microns. Although air oxidation does not simulate steam oxidation, this test nevertheless shows the potential for Cr cold spray coating to act as a barrier against corrosion and provide qualitative testimony to the adhesion of the coating under thermal shock conditions. Tests in steam environment have also shown promising results. The average weight gain ate for Cr coated ZIRLO (a Zr alloy) samples is about 0.03 mg/dm$^2$ day.

The cold spray method of depositing Cr or Cr based alloy coating onto Zr-alloy tube provides notable benefits over other coating techniques. For example, certain coating methods may not be feasible because of the presence of a native oxide layer on the Zr-alloy surface which interferes with deposition. Other coating methods have to be performed in vacuum chambers and result in low deposition rates which may not be economical. Yet other coating methods involve high temperatures or intense heat which may alter the microstructure of the Zr-alloy. Moreover, the Cr or Cr-based alloy coating does not thermally diffuse into the underlying Zr-alloy substrate under normal operating conditions, but it has been found that some thermal diffusion will occur under accident conditions, which is useful to better anchor the coating to the substrate exactly when it is needed most.

Following the deposition of the chromium coating 30 onto the substrate, the method may further include annealing the coating. Annealing modifies mechanical properties and microstructure of the coated tube. Annealing involves heating the coating in the temperature range of 200° C. to 800° C., and preferably between 350° C. to 550° C. It relieves the stresses in the coating and imparts ductility to the coating which is necessary to sustain internal pressure in the cladding. As the tube bulges, the coating should also be able to bulge. Another important effect of annealing is the deformed grains formed during cold spray process get recrystallized to form fine sub-micron sized equiaxed grains which may be beneficial for isotropic properties and radiation damage resistance.

Figure 3A:
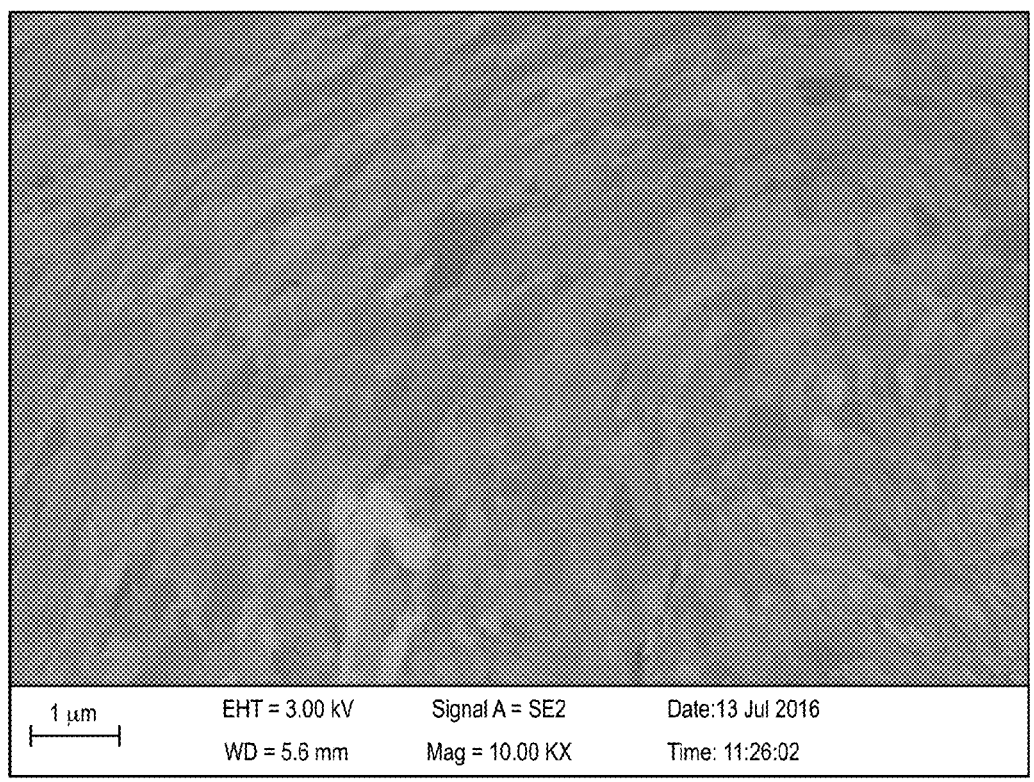
FIGS. 3(a) and (b) show high magnification images (10,000×) of (a) an as-deposited Cr cold spray coating showing deformed grain structure, and (b) the sub-micron, recrystallized grain structure of a Cr coating after annealing at 450° C. for 8 hours.
Figure 3B:
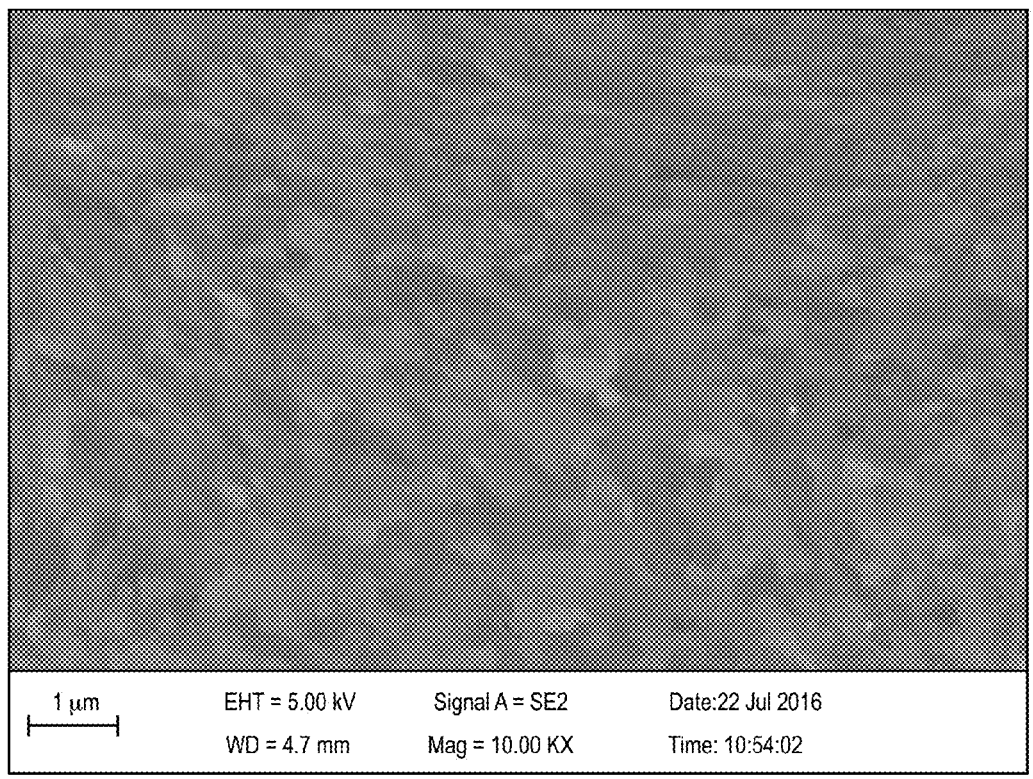

FIG. 3 shows high magnification images of the cold spray Cr coating in the as-deposited condition. FIG. 3a shows a deformed grain structure and after annealing at 450° C. for 8 hours (FIG. 3b) shows a fine grained recrystallized structure. The high strain rate plastic deformation or flattening of particles leads to adiabatic shear (i.e, heat stays within the system) which causes transient heating at the interfaces (again at nanometer length scales and nanosecond time scales). The adiabatic shear also fragments nanometer oxide layer that is inevitably present on powders and leads to metal-to-metal contact. Solid state diffusion (on nanometer length scales) between particles and particle and substrate lead to bonding.

Annealing following the deposition of the Cr or Cr-based alloy coating results in structures that are rather unique to cold spray coatings. This is very beneficial to achieving higher ductility, to better sustain tube bursts, as shown in testing, and is believed to be beneficial for radiation damage resistance. The coatings provided by the method described herein create the initial structure for giving rise to fine equiaxed grains.

The coated substrate may also be ground, buffed, polished, or treated by other known techniques to achieve a smoother surface finish.

The method described herein produces a cladding tube comprised of a zirconium alloy tube having a chromium coating of a desired thickness, for example, about 100 to 300 microns or more. Thinner coatings from about 50 to 100 microns thick may also be applied.

All patents, patent applications, publications, or other disclosure material mentioned herein, are hereby incorporated by reference in their entirety, except that all references, and any material, or portion thereof, that are said to be incorporated by reference herein are incorporated herein only to the extent that the incorporated material does not conflict with existing definitions, statements, or other disclosure material expressly set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method of coating a substrate of a component for use in a water cooled nuclear reactor, the method comprising:
   coating a substrate using a cold spray thermal deposition process comprising:
   heating a pressurized carrier gas to a temperature greater than 400° C. to 1200° C.;
   adding particles to the heated carrier gas, the particles being selected from the group consisting of pure chromium, chromium-based alloys, and combinations thereof, and having an average diameter of 20 microns or less; and
   spraying the carrier gas and entrained particles onto a substrate at a velocity of 800 to 4000 ft./sec. (about 243.84 to 1219.20 meters/sec.) to form a coating on the substrate.

2. The method recited in claim 1 wherein the substrate is a zirconium alloy.

3. The method recited in claim 1 wherein the carrier gas is selected from the group consisting of nitrogen, carbon dioxide, combinations of nitrogen and carbon dioxide, and combinations of nitrogen and helium.

4. The method recited in claim 1 wherein the particles are pure chromium particles.

5. The method recited in claim 1 wherein the carrier gas and entrained particles are sprayed continuously until the desired coating thickness is reached.

6. The method recited in claim 1 wherein the component is a nuclear fuel rod cladding tube.

7. The method recited in claim 1 wherein the substrate is cylindrical in shape.

8. The method recited in claim 1 wherein the substrate is flat.

9. The method recited in claim 1 wherein the coating thickness is between 5 and 100 microns.

10. The method recited in claim 1 wherein the rate of particles deposition is up to 1000 kg/hour.

11. The method recited in claim 1 further comprising, following formation of the coating, increasing the smoothness of the coating.

12. The method recited in claim 1 wherein the chromium-based alloy particles comprise 80 to 99 atom % of chromium.

13. The method recited in claim 12 wherein the Cr-based alloy further comprises at least one element selected from the group consisting of silicon, yttrium, aluminum, titanium, niobium, zirconium, and transition metal elements, at a combined content of 0.1 to 20 atomic %.

14. The method recited in claim 1 wherein the carrier gas is heated at a pressure up to 5.0 MPa.

15. A method of coating a substrate of a component for use in a water cooled nuclear reactor, the method comprising:
heating a pressurized carrier gas to a temperature between 200° C. and 1200° C.;
adding particles to the heated carrier gas, the particles being selected from the group consisting of pure chromium, chromium-based alloys, and combinations thereof, and having an average diameter of 20 microns or less; and
spraying the carrier gas and entrained particles onto a substrate at a velocity of 800 to 4000 ft./sec. (about 243.84 to 1219.20 meters/sec.) to form a coating on the substrate; and, following formation of the coating, annealing the coating.

16. The method recited in claim 15 wherein the particles are pure chromium particles.

17. The method recited in claim 15 wherein the coating thickness is between 5 and 100 microns.

18. The method recited in claim 15 wherein the rate of particles deposition is up to 1000 kg/hour.

19. The method recited in claim 15 wherein the chromium-based alloy particles comprise 80 to 99 atom % of chromium.

20. The method recited in claim 15 wherein the Cr-based alloy further comprises at least one element selected from the group consisting of silicon, yttrium, aluminum, titanium, niobium, zirconium, and transition metal elements, at a combined content of 0.1 to 20 atomic %.

21. The method recited in claim 15 wherein the carrier gas is heated at a pressure up to 5.0 MPa.

22. The method recited in claim 15 wherein the carrier gas is selected from the group consisting of nitrogen, hydrogen, argon, carbon dioxide, helium, and combinations thereof.

23. The method recited in claim 15 wherein the substrate is a zirconium alloy.

* * * * *